Figure 5:
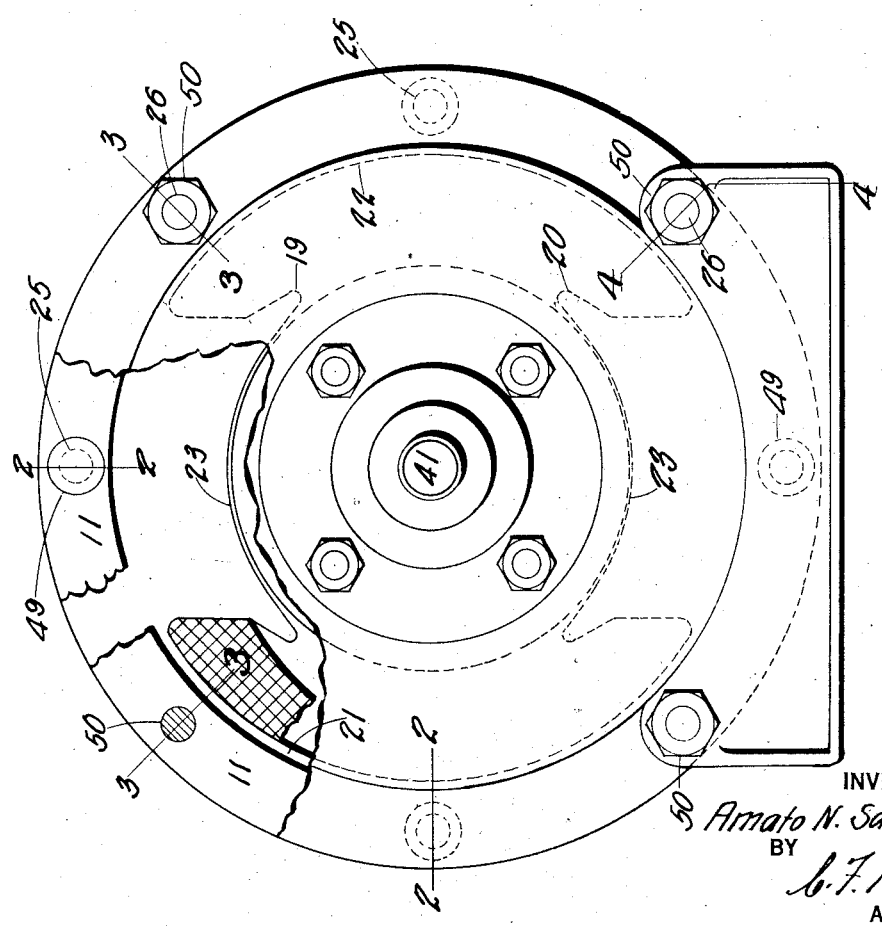

March 4, 1924.
A. N. SAMMARONE
DYNAMO ELECTRIC MACHINE
Filed May 9, 1921
1,485,533
2 Sheets-Sheet 1
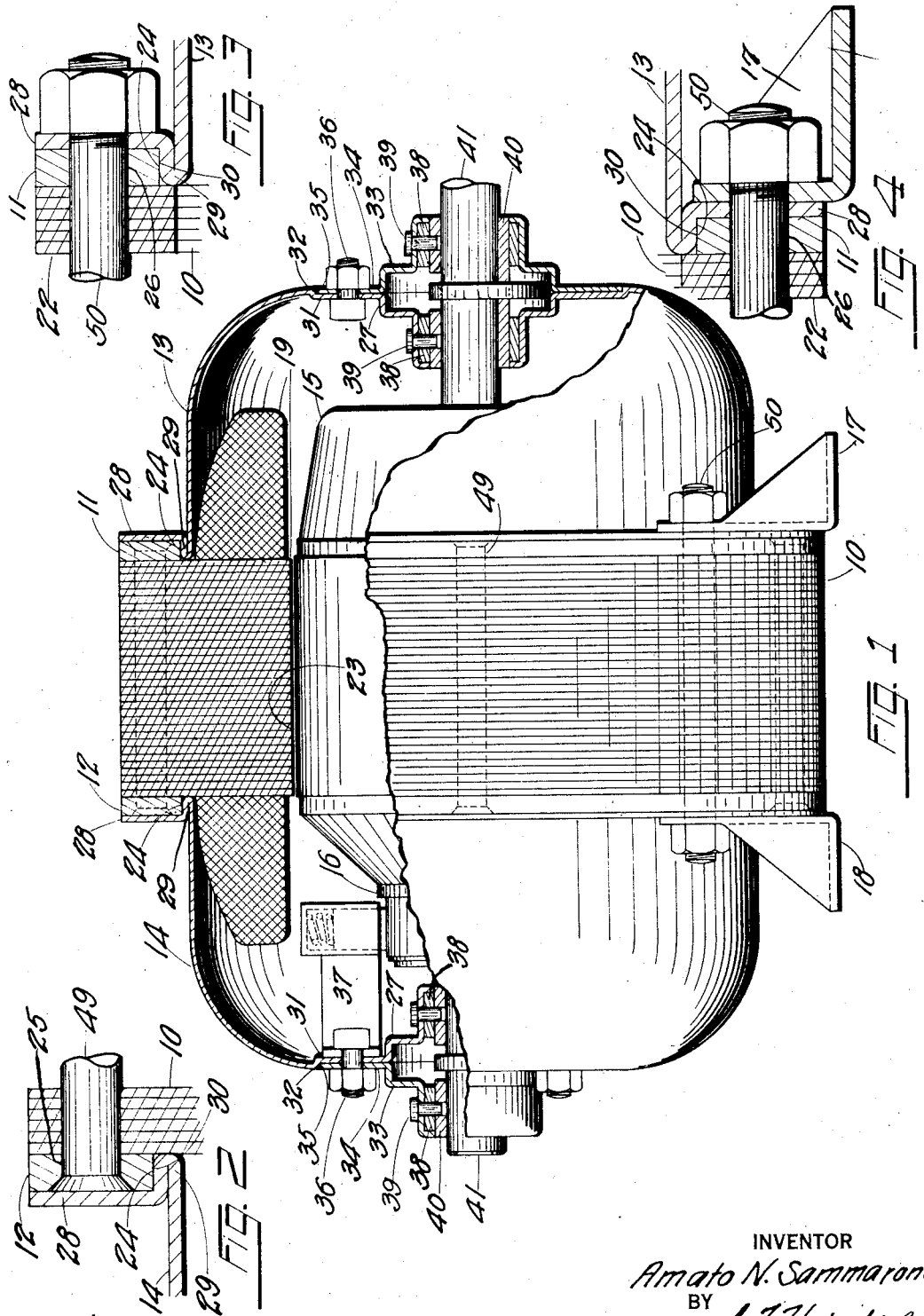
INVENTOR
Amato N. Sammarone
BY
C. F. Heinkel.
ATTORNEY March 4, 1924.

A. N. SAMMARONE 1,485,533

DYNAMO ELECTRIC MACHINE

Filed May 9, 1921    2 Sheets-Sheet 2

INVENTOR
Amato N. Sammarone
BY
C. F. Heinkel.
ATTORNEY

UNITED STATES PATENT OFFICE.

AMATO N. SAMMARONE, OF AKRON, OHIO.

DYNAMO-ELECTRIC MACHINE.

Application filed May 9, 1921. Serial No. 467,887.

*To all whom it may concern:*

Be it known that I, AMATO N. SAMMARONE, a citizen of the United States, residing at Akron, county of Summit, and State of Ohio, have invented a new and useful Improvement in Dynamo-Electric Machines, of which the following is a specification.

My present invention relates to dynamo-electric machines generally and to parts thereof specifically.

The object of this invention is an efficient, light-weight, and inexpensive dynamo-electric machine.

I attain this object by stamping adaptable parts out of sheet metal by means of dies thus assuring rapid production with absolute accuracy and uniformity of the parts, eliminating the machine work on these parts, eliminating the human tendency to err when machining these parts, and permitting of ready assembling of the parts without fitting or centralizing or otherwise locating the parts in relation to each other. The above features being accomplished by the mechanism hereinafter described and pointed out in the claims, and illustrated in the accompanying drawings in which Fig. 1 is a general side view partly in section of an electric motor embodying the features of the present invention; Fig. 2 is a partial section, on a larger scale, on line 2—2 of Fig. 5; Fig. 3 is a partial section, on a larger scale, on line 3—3 of Fig. 5; Fig. 4 is a partial section, on a larger scale, on line 4—4 of Fig. 5; and Fig. 5 is an end view partly in section of Fig. 1.

Similar reference characters refer to similar parts throughout the several views.

The motor shown in the drawings consists, mainly, of the field piece 10, the clamp-rings 11 and 12, the pedestals 13 and 14, the armature 15, the commutator 16, and the feet 17 and 18.

The field piece 10 is composed of laminations, each being easily and economically stamped from one piece with the pole-pieces 19 and 20 and with the rim portions 21 and 22, and provided with holes suitably spaced and concentric with the hole-piece faces 23 for bolts and rivets as will appear hereinafter.

The clamp-rings 11 and 12, preferably stamped from sheet metal have, each a central opening 24 and four holes 25 which are countersunk, and four plain holes 26. All of these holes being spaced to suit the spacing of the holes in the field piece 10 and are located concentric with the opening 24. These clamp-rings are economically produced by stamping and need no machining.

The pedestals 13 and 14 are economically formed of sheet metal and require no machining, and each is formed with one half of a bearing receptacle 27, and the flange 28, and the double-up annular portion 29 the face 30 of which is concentric with the bearing receptacle 27 and fits into the opening 24 of the clamp-rings 11 or 12. A series of holes, corresponding to the spacing of the holes in the field piece 10 and in the clamp-rings 11 and 12 and concentric with the face 30, is provided in the flange 28. It is preferred that the recess 31, with the annular face 32 concentric with the bearing receptacle 27 and with the face 30, be formed on each pedestal, and the other half of the bearing receptacle 33, also economically formed of sheet metal stamping and provided with the flange 34 and the concentric circumference 35 which fits the annular recess 32, be bolted to the pedestals 13 and 14 by the bolts 36 to permit ready removal of the receptacles 33 for the purpose of inspection or removal of the armature bearings. The brush holder 37 is also held in the pedestal 14 by the bolts 36, but may be held by independent bolts or other means when it is desired that the brushes should not be disturbed while inspecting or removing the armature bearings. The depth of each pedestal and the general contour thereof, not particularly specified, may be formed to suit the taste or requirements.

The bearing liners 38 fit into the receptacles 27 and 33 and are held therein by the pins 39 which project inside of the inner bore of the liners and enter the armature shaft bearings 40 which fit into the central bore of the liners 38 and are held in position by the projecting ends of the pins 39.

The armature shaft bearings 40 may be cut away at the top to permit the usual oil ring to accomplish its purpose.

The armature 15 may be constructed in the usual or any special manner, and has its shaft 41 journaled in the bearings 40.

The commutator 16 may be of any suitable construction and is connected with the armature and armature shaft in the usual manner.

The feet 17 and 18 are also formed of sheet metal stamping and each is provided with two bolt holes spaced to suit corresponding holes in the field piece 10 and in clamp-rings 11 and 12 and in pedestals 13 and 14, and are held in position by two of the bolts 50.

In order to assemble this motor, first assemble the laminations comprising the field piece 10 and see that the bolt holes line up. Then place the clamp-rings 11 and 12 on the ends of the field piece 10 and see that all of the bolt holes register and that two of the countersunk holes are located on a radial axis in line with the pole pieces and the other two at right angles thereto. Then pass the rivets 49 through these four countersunk holes and rivet this mass together so that the rivet heads do not project outside of the clamp-rings. Then place the pedestal 13 with the bearing 40 on the clamp-ring 11 where it will centralize itself on the face 30 of the projection 29. Then place the foot 17 on the flange 28 and see that the bolt holes register. Then pass the bolts 50 through the holes to partially hold the so far assembled parts in position. Then place the armature with the commutator into position. Then place the pedestal 14, with its bearing 40 and brush holder 37, on the clamp-ring 12 where the face 30 on the flange 29 centralizes the same in the opening 24. Then place the foot 18 on the flange 28. Then pass the bolts 50 entirely through the respective parts and tighten up the nuts on the bolts 50 whereupon the motor will be assembled and can readily be disassembled by merely removing the bolts 50.

It will be seen that the construction shown here is very simple, the field laminations and pole-pieces are of one stamping and alike, the clamp-rings are of one stamping and alike, the pedestals are of one stamping and alike, and the feet are of stampings and alike.

In the invention described, the number of different parts is brought down to a minimum and the largest part of machine work now required on machines of the kind described is eliminated.

By using stampings, castings and their machining are largely eliminated; no patterns are required and no waiting for castings; and the motor is lighter in weight than formerly without distracting any efficiency therefrom; in fact, this motor is more efficient than one with cast pedestals for instance since the lighter sectional area of the stamping permits less magnetic lines to pass therethrough and escape without accomplishing their purpose and compels more magnetic lines to pass across the air gap where they are required for efficient operation of the motor.

I claim:

1. A dynamo-electric machine including, a field piece, a clamp-ring on each end of said field piece, and a sheet metal pedestal on each of said clamp-rings and centralized therein by a double-up annular flange integral with said pedestal.

2. A dynamo-electric machine including, a field piece and pole-pieces composed of laminæ, a clamp-ring on each end of said laminæ and secured thereto by rivets passing through said laminæ and said clamp-rings and the heads thereof countersunk into said clamp-rings, a sheet metal pedestal on each of said clamp-rings and centralized therein by a double-up annular flange integral with said pedestal, and bolts passing through said pedestals and said clamp-rings and said laminæ intermediate said rivets to hold said pedestals longitudinally to said clamp-rings.

3. A dynamo-electric machine including, a field piece, a clamp-ring on each end of said field piece, a sheet metal pedestal on each of said clamp-rings and centralized therein by a double-up annular flange integral with said pedestal and each pedestal provided with one half of one armature bearing case, a cap comprising the other half of said armature bearing case secured to the outside of each of said pedestals to complete the armature bearing case and permit the ready removal of either of said caps without disturbing other parts of said machine.

4. A sheet metal pedestal for dynamo-electric machine, comprising, a central portion adapted to receive an armature bearing, a flange portion on the outer edge thereof, and an annular centralizing portion substantially at right angles to said flange portion and comprised of two thicknesses of metal doubled upon each other.

AMATO N. SAMMARONE.